3,119,786
GRAFT COPOLYMER OF 1,3-BUTADIENE ON VINYL CHLORIDE-VINYL ACETATE COPOLYMER
Gilbert Paul Christen, Lyon, and Eugene Million Guidal, Lyon (Rhone), France, assignors to Societe des Usines Chimiques Rhone-Poulenc, Paris, France, a French body corporate
No Drawing. Filed Feb. 23, 1961, Ser. No. 90,964
Claims priority, application France Mar. 4, 1960
1 Claim. (Cl. 260—45.5)

The present invention relates to rigid compositions based on homopolymers of vinyl chloride or copolymers of vinyl chloride with vinyl acetate, which possess remarkable shock-resistant properties.

Polyvinyl chloride and vinyl chloride-vinyl acetate copolymers are extensively employed in the manufacture of rigid articles such as moulded objects, sheets, plates, tubes, shaped sections, rigid cellular materials and the like.

While unplasticised polyvinyl chloride constitutes a material of choice by reason of its excellent physical and chemical properties, it is nevertheless lacking in one mechanical characteristic, i.e. resilience. Vinyl chloride-acetate copolymers, while possessing the same fundamental properties, associated with better solubility in the usual organic solvents and good thermoplasticity, have even lower resilience than unplasticised polyvinyl chloride.

Rigid articles consisting of unplasticised polyvinyl chloride or vinyl chloride-acetate copolymer are therefore rather fragile, which seriously limits their field of use.

Various methods have been proposed for reducing this fragility. One method consists in adding elastomeric polymers to polyvinyl chloride or vinyl chloride-acetate copolymers. However, a favourable effect is obtained only if the elastomeric polymer is compatible with the vinyl polymers. If the elastomeric polymer is not compatible, there is observed, instead of an improvement, a very distinct reduction in the shock resistance of the products. This is the case more especially if polybutadiene is added to polyvinyl chloride.

Even when normally compatible elastomeric polymers are mixed with the vinyl polymers, mixtures are obtained which, under certain conditions, may become heterogeneous. This may happen, for example, when semi-finished products prepared from these mixtures are subjected to finishing operations.

In an effort to avoid such heterogeneity, it has been proposed instead of simply mixing polybutadiene with the vinyl polymer to copolymerise butadiene with vinyl chloride, or with the mixture of vinyl chloride and vinyl acetate, thereby to produce a single copolymer product. In practice, however, there is considerable difficulty in effecting this copolymerisation and the products obtained are not homogeneous.

It has now been found, and this forms the subject of the present invention, that it is possible to obtain highly resilient rigid compositions based on polyvinyl chloride or chloride-acetate copolymers containing 1:3-butadiene by providing that the 1:3-butadiene is grafted in the monomeric state onto the polyvinyl chloride or the chloride-acetate copolymer.

According to the present invention, therefore, there are provided highly resilient rigid thermoplastic compositions based on polyvinyl chloride, or vinyl-chloride-vinyl-acetate copolymers which contain 1% to 20% of polymerised 1:3-butadiene attached by grafting.

According to a further feature of the invention, such compositions are prepared by polymerising 1:3-butadiene in an aqueous suspension of polyvinyl chloride or vinyl-chloride-vinyl-acetate copolymer.

The best results are obtained with polyvinyl chloride if the aqueous suspension is a latex, and with vinyl chloride-acetate copolymer if a latex or a fine suspension of powder is employed.

Unexpectedly, while the products obtained from the mixing of a polyvinyl chloride or chloride-acetate copolymer latex with a polybutadiene latex are more fragile than the initial products, the products obtained by grafting, even if the latter is only partial, have remarkable properties of resilience.

As starting materials, there may be employed either the latex obtained by polymerisation of vinyl chloride in aqueous emulsion or the products obtained by polymerisation in aqueous emulsion or in aqueous suspension, in accordance with known methods, of a mixture of vinyl chloride and vinyl acetate. Preferably the latter has a high chloride content, e.g. 80% or more, the commonest on the market having a chloride:acetate ratio of 85:15 or 90:10.

If the grafting is effected using a latex, the latter may be employed in its usual industrial form, and its polymer content may vary within wide limits, contents of from 15% to 30% having proved the most convenient to use.

The content of emulsifying agent in the latex will preferably be just sufficient to ensure that it is stable; an excess of emulsifying agent tends to favour homopolymerisation of the butadiene.

The latex will advantageously be degassed before the grafting operation in order to eliminate any unpolymerised vinyl derivatives contained therein.

When the grafting is effected using a vinyl chloride-acetate copolymer of the suspension type, the powder employed preferably has a grain size between 20 and 200 microns. This powder may be dispersed in water to a dry copolymer content between 10% and 70%, and preferably from 15% to 35%, in relation to the total weight of the aqueous dispersion.

The polymerisation may be carried out by any known methods in the presence of a free radical catalyst.

As free radical catalysts there may be employed either water-soluble catalysts in the case of latices, such as per-salts, or redox catalysts, more especially potassium, sodium or ammonium persulphates, or in the case of suspensions catalysts soluble in butadiene, e.g. organic peroxides, such as benzoyl peroxide.

The free radical catalyst content is advantageously between 0.5% and 5% of the quantity of butadiene.

The polymerisation temperature may vary, e.g. between 20° and 100° C., but the operation is advantageously carried out between 30° and 80° C.

In order to obtain a resilient rigid polymer, the percentage of butadiene to be attached to the polymer must be between 1% and 20% of the quantity of polymer or copolymer, and preferably from 3% to 15%.

In order that the composition obtained may be homogeneous, it is necessary, and sufficient, that the extent of the grafting should reach a minimum value of 0.5, that is to say, that the quantity of grafted butadiene formed in the course of the reaction should be equal to or higher than 50% of the total quantity of polybutadiene present in the final composition. This proportion may be determined by extraction with a solvent, such as toluene, which extracts only the ungrafted polybutadiene.

The polymers obtained in accordance with the invention are greatly superior in shock resistance to the mere admixtures referred to above, all other mechanical properties being retained substantially without loss.

In the case of vinyl chloride-acetate copolymers in particular, this improvement, which is already very appreciable in the case of the products obtained by grafting onto these polymers in suspension, becomes considerably greater in the case of the products obtained by grafting onto a latex of the copolymer.

The possibility of obtaining shock-resistant compositions by grafting onto copolymers of the suspension type is technically very valuable because it is known that the thermal stability of these copolymers is greater than that of the corresponding copolymers obtained in the form of latices. Furthermore, in this method the grafting can be effected on a powder prepared a long time in advance, whereas it is scarcely practicable to store a polymer in the form of a latex for any long period.

The following examples will serve to illustrate the invention.

*Example I*

A polyvinyl chloride latex was prepared by introducing under nitrogen into a 1-litre autoclave provided with a stirrer:

| | G. |
|---|---|
| Water | 600 |
| Stearic acid | 2 |
| $Na_2CO_3$ | 1.8 |
| $K_2S_2O_8$ | 1 |
| Vinyl chloride | 200 |

The mixture was heated for 3 hours at 50° C. with stirring to effect polymerisation. A 98% conversion of the vinyl chloride was thus obtained.

800 g. of this latex, carefully degassed, was introduced into a 1 litre autoclave provided with a stirrer and 30 g. of butadiene were then introduced. The mixture was stirred at or slightly above room temperature for 3 hours in order to homogenise it, and there was then injected into the autoclave an aqueous potassium persulphate solution coresponding to a proportion of 2.5% of $K_2S_2O_8$ in relation to the butadiene. The mixture was then polymerised for 4 hours with stirring, the temperature being maintained at 50° C. After this period of time, the extent of the conversion of the butadiene was approximately 80%. The latex was then coagulated with a calcium chloride solution. The polymer was washed and then dried at 50° C. in vacuo.

The polybutadiene content of the copolymer, determined by titration, was found to be 9%. Extraction with toluene showed that the degree of grafting was approximately 0.65.

In order to determine the shock resistance of the articles produced with this copolymer, specimens were produced (a) with polyvinyl chloride having grafted butadiene in accordance with this example (containing 10% of butadiene), (b) with polyvinyl chloride as employed in this example but not grafted, and (c) the product resulting from mixing a polyvinyl chloride latex with a polybutadiene latex to give the same proportion of 10% of butadiene in relation to the polyvinyl chloride. Measurements were made on specimens moulded at 212° C. on a Dynstat, modified Izod type, in accordance with the American standard ASTM D 256–54T. The results are expressed by the value ½e where e is the breaking energy in kg./cm. in the case of specimens having a cross-section of 20 mm.² The following results were obtained:

| | ½e |
|---|---|
| (a) Polyvinyl chloride grafted on butadiene | 19 |
| (b) Unplasticised polyvinyl chloride | 6.5 |
| (c) Mixture of polyvinyl chloride and polybutadiene | 2.9 |

The breaking energy thus measured is a measure of the resilience of the specimens. Thus, in the case of the grafted polymer this resilience is substantially three times the value of that of pure polyvinyl chloride and seven times the value of that of the mixture.

The other favourable properties of the polyvinyl chloride remain substantially unchanged. For example, the Vicat temperature (measured in accordance with the standard DIN 7705 by impression of a point having a cross-section of 1 mm.², loaded with 1 kg., in a compression-moulded disc of a thickness of 4 mm., with a temperature rise of 120° C. per hour), which is found to be 86° C. in the case of pure polyvinyl chloride, is 87° C. in the case of the grafted copolymer.

The Young's modulus measured at 23° C. is 230 kg./mm.² in the case of the grafted polymer.

*Example II*

(a) There were introduced into an autoclave 2500 g. of a vinyl chloride-acetate copolymer latex (ratio of chloride to acetate=85:15), of which the dry content is 25%. There was then added 69 g. of butadiene. The mixture was stirred for 3 hours at a temperature of 60° C. in order to homogenise it, and an aqueous solution of 0.69 g. of potassium persulphate in 100 cc. of water was then introduced. 150 mg. of lauryl mercaptan were added, and the mixture was then polymerised, the autoclave being maintained at 60° C. with stirring until the pressure fell, i.e. for about 16 hours.

The latex obtained was thereafter coagulated by the addition of a calcium chloride solution, washed and then dried at 50° C. in vacuo. A chlorine titration showed that the grafted polymer obtained contained 9% of polybutadiene.

By dissolving 2 g. of polymer in 200 cc. of cyclohexanone, a clear solution was obtained which contained no trace of undissolved product and which showed—polybutadiene not being soluble in cyclohexanone—that the grafted polymer contained no butadiene homopolymer.

(b) There were introduced into a similar autoclave 600 g. of powdered chloride-acetate copolymer (85:15) of the suspension type, which was dispersed in 1800 g. of water, and 67 g. of butadiene was then added. The autoclave was maintained at 60° C. with stirring for 3 hours and a solution of 0.67 g. of lauroyl peroxide in 50 cc. of benzene was added. The mixture was polymerised, the autoclave being maintained at 60° C. with stirring, until the pressure fell, i.e. for about 15 hours. The polymer obtained was then washed and dried in vacuo at 50° C.

A chlorine titration showed that the grafted polymer contained 6.5% of polybutadiene. A test dissolution in cyclohexanone, carried out under the same conditions as in the case of (a) above, showed that the polymer obtained contained no butadiene homopolymer.

(c) In order to make a comparative test, the impact resistances of moulded articles produced from the polymer obtained in accordance with (a) above, from the polymer obtained in accordance with (b) above, and with the vinyl chloride-acetate copolymer used as starting material in (a) above (serving as a control specimen) were measured.

The conditions of the tests were as follows:

Each of the three above specimens was rolled for a quarter of an hour at 125° C. to obtain a sheet 2.5 mm. thick. This sheet served for the moulding of plates of a thickness of 1.2 and 2 mm. in a mould 120 x 200 mm. under a pressure of 100 kg./cm.² for 15 minutes at a temperature 10° C. above the melting point of the polymers, followed by cooling under pressure.

Discs 76 mm. in diameter and 4 mm. thick were also moulded under a pressure of 20 kg./cm.² for 20 minutes at the same temperature as before.

There were then measured:

(i) the "breaking energy" with the aid of the Dynstat-Schopper apparatus (in accordance with the German standard DIN 53.453) on specimens 10 x 15 x 2 mm., the knife edge being so adjusted as to strike the specimen 1 mm. from the gripping point, and (ii) the "fragility index," by finding on the apparatus just referred to the distance of the point of impact from the gripping point which produced the breakage of at least four specimens out of ten, the fragility index being higher, with a given thickness, in proportion as the specimen breaks more easily.

The results obtained are given in the following table:

|  | Standard chloride-acetate copolymer 85:15 | Grafted polymer of (b) | Grafted polymer of (a) |
|---|---|---|---|
| Breaking energy in kg./cm./20 mm.² | 1.8 | 7 | 10.5 |
| Fragility index | 30 | 12 | 2 |

It will be seen that with identical specimens which have undergone the same treatments, the fragility index is reduced by half in relation to the standard copolymer when butadiene is grafted onto the chloride-acetate copolymer in suspension (b), and is reduced fifteen times when the same grafting is effected on the standard copolymer.

The other favourable properties of the 85:15 chloride-acetate copolymer remain substantially unchanged. For example, the Vicat temperature, measured as stated in Example I, which is 64° C. in the case of a standard latex-type copolymer, is 67° C. in the case of the grafted copolymers obtained in (a) and (b) above. The melting temperature, which reaches 139° C. in the case of the standard specimen, is 133° C. and 137.5° C. respectively, in the case of the grafted polymers described under (a) and (b). The Young's modulus, measured at 23° C., is 260 kg./mm.² in the case of the standard copolymer and 235 and 220 kg./mm.² respectively in the case of the grafted polymers described under (a) and (b).

The grafted polymers obtained in accordance with Example II are compatible with the resilient polyvinyl chloride polymers described in Example I, so that it is possible by mixing the two products, to obtain an entire range of compositions whose Vicat temperatures and operating temperatures vary continuously between the two extremes.

We claim:

Highly resilient rigid thermoplastic compositions based on a vinyl-chloride-vinyl-acetate copolymer which contains more than 80% of vinyl chloride units, the said copolymer having grafted thereon 3% to 15% of polymerised 1:3-butadiene as the sole graft thereon.

References Cited in the file of this patent
UNITED STATES PATENTS

| 2,614,089 | Harrison et al. | Oct. 14, 1952 |
| 2,996,469 | Cole et al. | Aug. 15, 1961 |